United States Patent
Horstman et al.

(10) Patent No.: US 12,251,638 B2
(45) Date of Patent: Mar. 18, 2025

(54) SYSTEM AND METHOD FOR NAVIGATING THROUGH A DYNAMIC VIRTUAL LOUNGE WITHIN A METAVERSE

(71) Applicant: Bank of America Corporation, Charlotte, NC (US)

(72) Inventors: Michael George Horstman, Chicago, IL (US); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 203 days.

(21) Appl. No.: 17/811,171

(22) Filed: Jul. 7, 2022

(65) Prior Publication Data
US 2024/0009574 A1  Jan. 11, 2024

(51) Int. Cl.
*A63F 13/00* (2014.01)
*A63F 13/56* (2014.01)
*A63F 13/71* (2014.01)
*A63F 13/79* (2014.01)

(52) U.S. Cl.
CPC .............. *A63F 13/79* (2014.09); *A63F 13/56* (2014.09); *A63F 13/71* (2014.09)

(58) Field of Classification Search
CPC ........ A63F 13/79; A63F 13/30; A63F 13/795; A63F 13/69; A63F 13/00
See application file for complete search history.

(56) References Cited

U.S. PATENT DOCUMENTS

| | | |
|---|---|---|
| 6,476,830 B1 | 11/2002 | Farmer et al. |
| 7,958,453 B1 | 6/2011 | Taing |
| 8,527,430 B2 | 9/2013 | Hamilton, II et al. |
| 9,238,174 B2 | 1/2016 | Hoffman et al. |
| 9,251,318 B2 | 2/2016 | Hamilton, II et al. |
| 9,256,896 B2 | 2/2016 | Bolger et al. |
| 2006/0119598 A1 | 6/2006 | Littlefield |
| 2008/0204450 A1 | 8/2008 | Dawson et al. |

(Continued)

OTHER PUBLICATIONS

NBA 2k21 Rookieville—https://youtu.be/nwb7YwKRN1U?si=ij-87T2uNj8TNZRD (Year: 2021).*

(Continued)

*Primary Examiner* — David L Lewis
*Assistant Examiner* — Eric M Thomas (57) ABSTRACT

A system for navigating through dynamic virtual lounges comprises a processor associated with a server. The processor is configured to access a virtual environment comprising a virtual lounge and a plurality of associated virtual sub-lounges. The processor is configured to authorize an interaction session between an avatar and the virtual lounge in response to an interaction request received from a user device. The processor is configured to automatically detect and authorize the avatar to enter and interact with each virtual sub-lounge of the virtual lounge. The processor is configured to conduct multiple interactions between the avatar and the virtual sub-lounges. The processor is further configured to generate corresponding interaction datasets and interaction tokens for the avatar. The processor is further configured to generate a user interaction session dataset for the avatar based on the interaction datasets and interaction tokens.

17 Claims, 4 Drawing Sheets

(56) References Cited

U.S. PATENT DOCUMENTS

| | | |
|---|---|---|
| 2009/0158150 A1 | 6/2009 | Lyle et al. |
| 2013/0014033 A1 | 1/2013 | Hamick et al. |
| 2013/0017891 A1 | 1/2013 | Romero et al. |
| 2013/0035991 A1 | 2/2013 | Romero et al. |
| 2018/0374145 A1* | 12/2018 | Koon ................ G06Q 30/0643 |
| 2019/0199761 A1* | 6/2019 | Felman ................ H04L 67/55 |
| 2021/0217241 A1 | 7/2021 | Shuster et al. |
| 2021/0308578 A1 | 10/2021 | Benzies |
| 2022/0023761 A1 | 1/2022 | Li et al. |

OTHER PUBLICATIONS

The Trafic Evolution of NBA 2k Vc Prices—https://youtu.be/AdYHvm2tEUM?si=jqQsKgGBmFKo_M3W (Year: 2022).*

* cited by examiner

SYSTEM AND METHOD FOR NAVIGATING THROUGH A DYNAMIC VIRTUAL LOUNGE WITHIN A METAVERSE

TECHNICAL FIELD

The present disclosure relates generally to network communications and information security, and more specifically to navigate through a dynamic virtual lounge and perform interactions within a metaverse.

BACKGROUND

An organization entity may provide different services at different physical locations and through different systems or platforms in a network. A user generally performs actions with their same profile information and interacts with one or more organization entities. Since the user may not be able to access different services at the same physical location through a single platform, a user may have to visit multiple physical locations or access to different platforms to obtain services and perform actions with the same entity or different entities using their profile. Moreover, these different systems or platforms in the network may not allow user profile information to be shared or exchanged with each other due to technical challenges of lack of controlling data leakage, unauthorized access to user data, preventing malicious activities, etc. Existing systems are typically unable to allow the user to access different services associated with the same or different entities at different physical locations and/or through different systems or platforms without reauthentication in the network. User reauthentication in this context consumes valuable computer, memory, and network resources.

SUMMARY

Current technology is not configured to integrate different services associated with the same or different entities at different physical locations and/or through different systems or platforms without reauthentication in the network. The system described in the present disclosure is particularly integrated into a practical application and provides technical solutions to the technical problems of previous systems. This disclosure provides various systems and methods for navigating through a dynamic virtual lounge without reauthentication and performing interactions through a plurality of virtual sub-lounges in the virtual lounge within a virtual environment. This disclosure integrates different services provided by different systems or platforms in the physical and virtual environment.

In one embodiment, the system for navigating through the dynamic virtual lounge without reauthentication comprises a processor and a memory. The processor accesses a virtual environment, such as a metaverse. The virtual environment includes a virtual lounge and a plurality of associated virtual sub-lounges. The virtual lounge is associated with at least one entity in a real-world environment. The plurality of associated virtual sub-lounges are associated with corresponding entities in the real-world environment. The processor receives an interaction request from a user device for an interaction session in the virtual environment between an avatar associated with the user device and the virtual lounge. The processor authorizes the interaction session in the virtual environment between the avatar and the virtual lounge based on the user profile. The processor detects the avatar entering a first virtual sub-lounge of the virtual lounge. The processor authorizes the avatar to enter and interact with the first virtual sub-lounge of the virtual lounge based at least in part upon the user login credentials associated with the virtual lounge. The processor conducts a first interaction between the avatar and the first virtual sub-lounge and generates a first interaction dataset and a first interaction token for the avatar. The first interaction dataset includes data representing the first interaction between the avatar and the entity. The first interaction token indicates that the first interaction is complete. The processor detects the avatar entering a second virtual sub-lounge of the virtual lounge. The processor authorizes the avatar to enter and interact with the second virtual sub-lounge of the virtual lounge based at least in part upon the user login credentials associated with the virtual lounge. The processor conducts a second interaction between the avatar and the second virtual sub-lounge and generates a second interaction dataset and a second interaction token for the avatar. The second interaction dataset includes data representing the second interaction between the avatar and the entity. The second interaction token indicates that the second interaction is complete. The processor generates a user interaction session dataset for the avatar. The user interaction session dataset is generated based on the first interaction dataset, the first interaction token, the second interaction dataset and the second interaction token.

In one embodiment, the processor identifies a set of virtual sub-lounges in a particular order based on communication received from the user device. The set of virtual sub-lounges is configured to provide respective interactions in the interaction session between the avatar and the virtual lounge in response to receiving the interaction request. The processor determines the first virtual sub-lounge of the virtual lounge for the avatar to enter. The processor sends the first interaction token to the user device to indicate that the first interaction is complete. The processor updates the user profile based on the first interaction dataset and the first interaction token. The processor presents the first interaction token, the updated user profile, and the first interaction dataset on a graphical user interface of the user device. The processor reviews the user interaction session dataset to determine whether each of the interaction sessions is complete. The processor presents the user interaction session dataset on a graphical user interface of the user device in response to determining that each of the interaction sessions are complete. In one embodiment, the processor receives a signal indicating a physical location of the user device in the real-world environment and stores the received signal in the memory. The processor determines a virtual location of the avatar associated with the user device in the virtual environment based on the physical location of the user device.

The system described in the present disclosure provides technical solutions to the technical problems of the previous systems. For example, a virtual lounge interaction model and other software models or modules may be integrated into a software application implemented by a server. The practical application may be implemented by the processor of the server to process communication data from a user device, generate an avatar associated with the user device, and detect the avatar entering the virtual lounge in a virtual environment. Further, the practical application may be implemented by the processor to authorize the avatar to seamlessly navigate through a plurality of virtual sub-lounges without reauthentication, perform interactions with the entities associated with the virtual sub-lounges, and complete a task predefined in the virtual lounge via the network in real time.

The disclosed system provides several technical advantages that overcome the previously discussed technical problems. The disclosed system is related to an information security server that provides a practical application that improves the information security of the computer system by using virtual reality technology. The practical application is implemented to generate a plurality of virtual sub-lounges in the virtual environment and integrate different services provided by different entities at different physical locations in the real-world environment. This process provides information security to the overall computer system since it is employed to provide an efficient and effective way to authorize the avatar associated with the user device to seamlessly navigate through the virtual sub-lounges without reauthentication, perform interactions with different entities or sub-entities, and complete the task in the virtual lounge in the virtual environment via the network. Since user reauthentication requires a user to submit credentials each time it moves from one sub-lounge to another sub-lounge, it requires network bandwidth to be used when transmitting the credentials. It also requires additional memory space to be used when storing the credentials in cache. Further, additional processor cycles are required to verify the credentials. By avoiding reauthentication, the disclosed system may prevent any unnecessary increases in the number of network resources and bandwidth that are consumed that would otherwise negatively impact on information security and the throughput of the computer system. In this way, the disclosed system may prevent the failed interactions which may lead to the unnecessary use of network resources and computer resources of the system. Thus, the network communication bandwidth among the computer systems is not wasted. Accordingly, the disclosed system conserves computer processing, memory utilization, and network resources.

The disclosed system may further be integrated into an additional practical application of improving the underlying operations of the computer system. The computer system is tasked to carry out steps to authorize an interaction session for an avatar associated with a user device to seamlessly navigate without reauthentication and perform interactions with corresponding virtual sub-lounges in the virtual environment. For example, the user may operate a user device and use the avatar to navigate through the virtual lounge in the virtual environment via the network while interacting with different entities or sub-entities which provide services with different systems or platforms at different physical locations in the physical environment. The disclosed system improves the process to implement the task associated with different services, entities, systems, and platforms.

The disclosed system may further be integrated into an additional practical application of improving the underlying technology of computer systems in a computer network. The disclosed system is implemented to authorize the avatar seamlessly navigate within the virtual lounge in the virtual environment via the network. By avoiding reauthentication, the disclosed system may be executed to process communicate data in response to a plurality of requests and complete the corresponding task more quickly and efficiently in the virtual environment that would otherwise be spent using the current technology. The disclosed system improves user experiences and saves task processing time of the computer systems. The disclosed system improves the process of processing a great of amount of user profiles and requests simultaneously and improves information communication including data sharing and exchanging within the network by using virtual reality technology. Thus, the disclosed system improves computer system processing efficiency and the operations of the overall computer system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
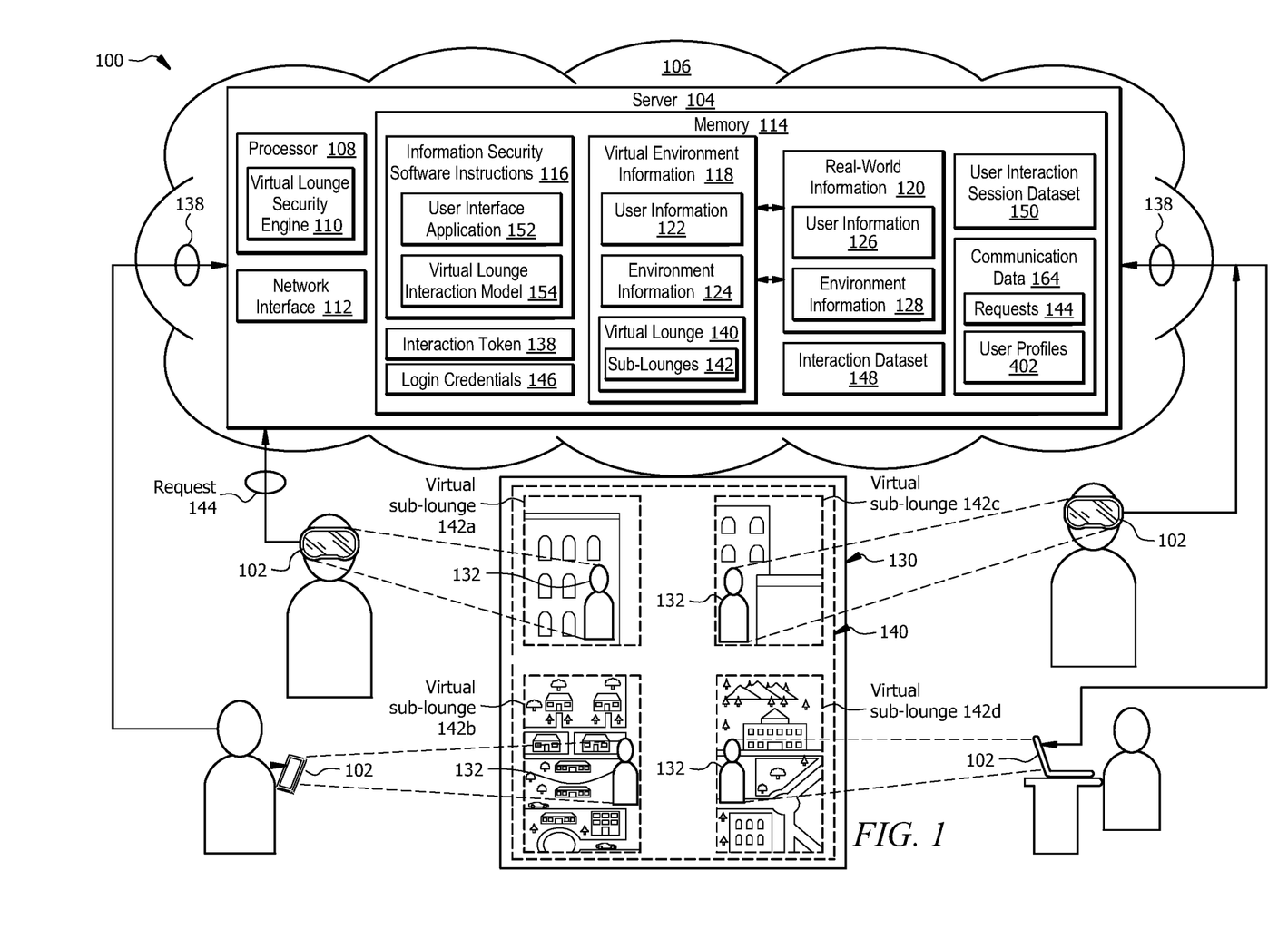
FIG. 1 illustrates an embodiment of a system configured to provide a dynamic virtual lounge in a virtual environment.
Figure 2:
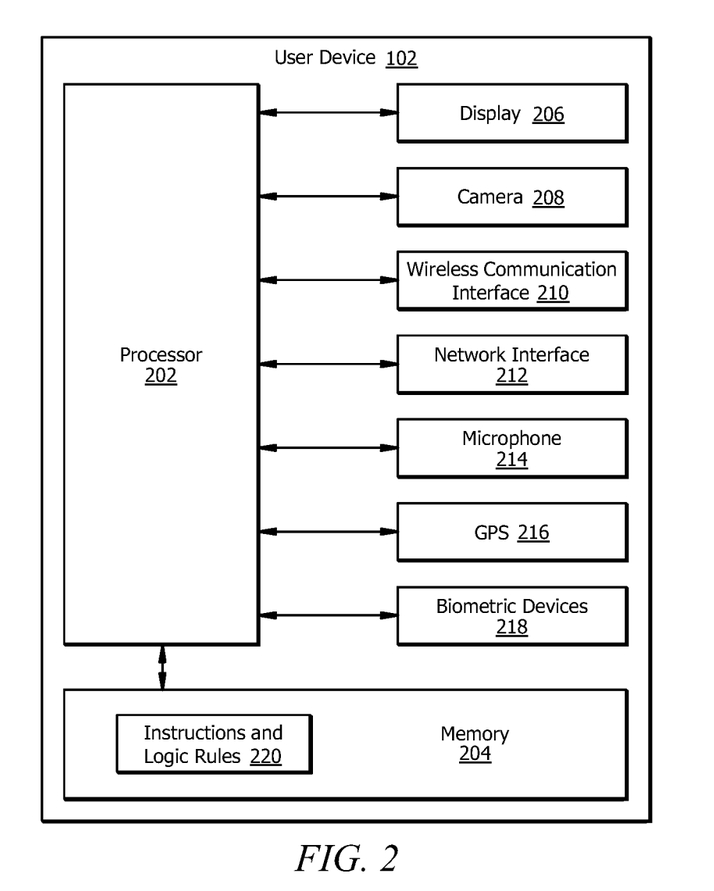
FIG. 2 is a block diagram of an example user device of the system of FIG. 1.
Figure 3:
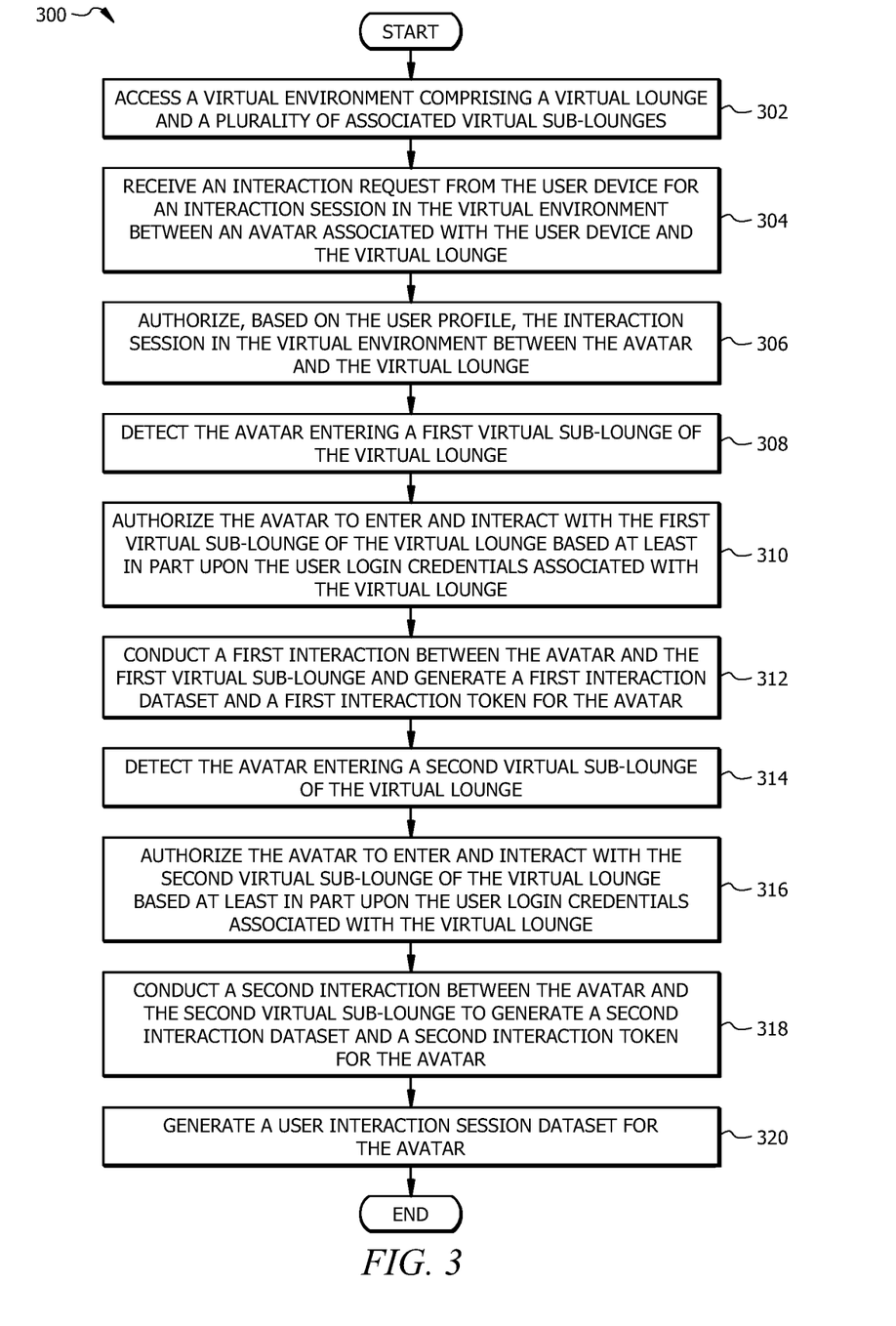
FIG. 3 is an example operational flow of a method for an avatar to navigate through a dynamic virtual lounge and perform interactions in the virtual environment.
Figure 4:
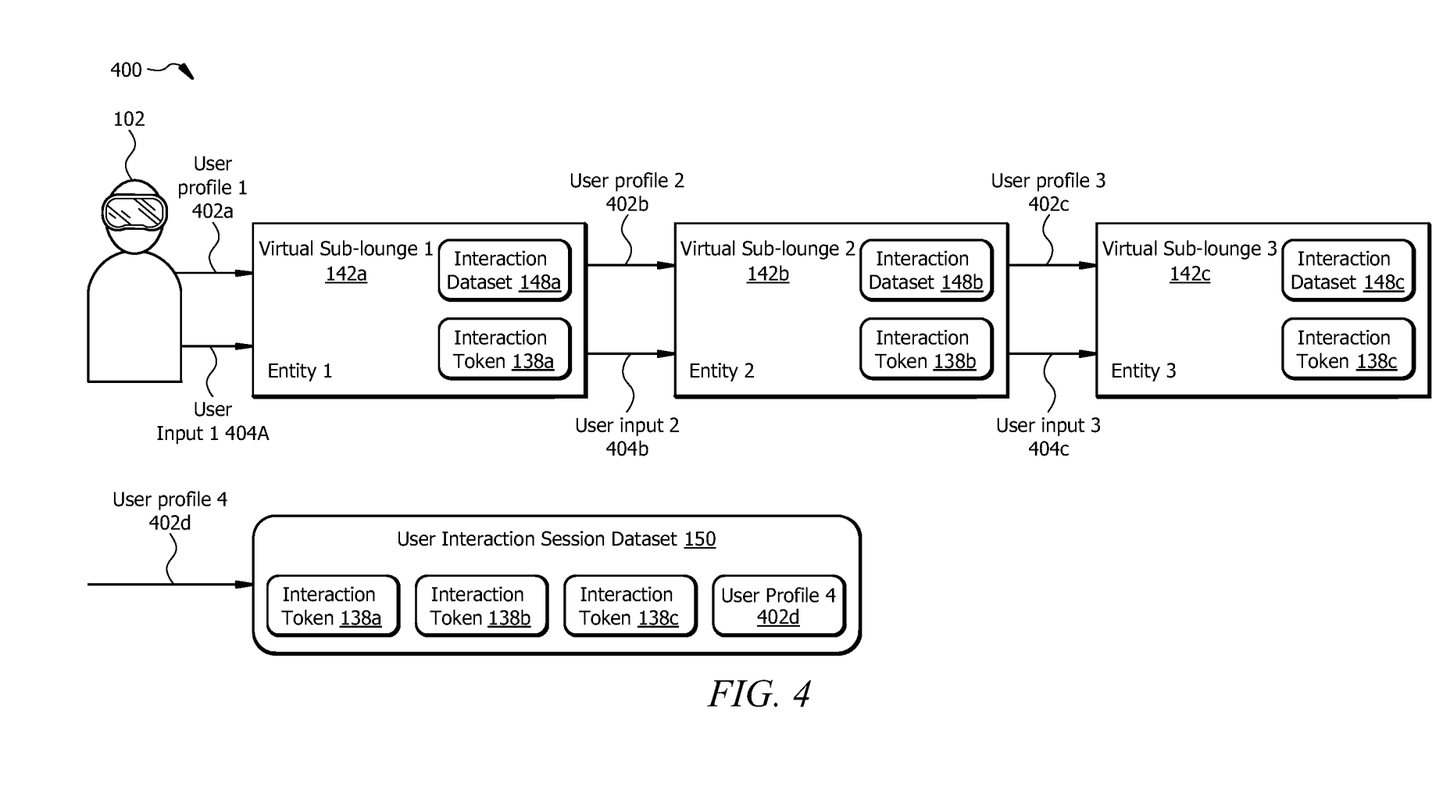
FIG. 4 is an example operational data flow of the method in FIG. 3 for the avatar to navigate through the dynamic virtual lounge and perform interactions in the virtual environment.

As described above, previous technologies fail to integrate different services associated with the same or different entities at their physical locations and/or through different systems or platforms without reauthentication in the network. This disclosure provides various systems and methods for navigating through a dynamic virtual lounge without reauthentication and performing interactions in the network. FIG. 1 illustrates an embodiment of a system configured to provide a dynamic virtual lounge in a virtual environment. FIG. 2 is a block diagram of an example user device of the system of FIG. 1. FIG. 3 is an example operational flow of a method for an avatar to navigate through a dynamic virtual lounge and perform interactions in the virtual environment. FIG. 4 is an example operational data flow 400 of the method in FIG. 3 for the avatar to navigate through the dynamic virtual lounge and perform interactions in the virtual environment.

Example System for Creating a Dynamic Virtual Lounge and Providing Dynamic Navigation and Network Communication FIG. 1 illustrates one embodiment of a system 100 that is configured to create a dynamic virtual lounge 140 and provides dynamic navigation and network communication through a plurality of virtual sub-lounges 142 in the dynamic virtual lounge 140 within a virtual environment 130. In one embodiment, system 100 comprises a server 104, one or more user devices 102, and a network 106. The system 100 may be communicatively coupled to the network 106 and may be operable to transmit data between each user device 102 and the server 104 through the network 106. Network 106 enables the communication between components of the system 100. Server 104 comprises a processor 108 in signal communication with a memory 114. Memory 114 stores information security software instructions 116 that when executed by the processor 108, cause the processor 108 to execute one or more functions described herein. For example, when the information security software instructions 116 are executed, the processor 108 executes a virtual lounge interaction engine 110 to process a user profile in response to a corresponding interaction request. The processor 108 executes the virtual lounge interaction engine 110 to provide dynamic navigation and network communication for an avatar 132 associated with a user device 102 through the dynamic virtual lounge 140 in the network 106. In other embodiments, system 100 may not have all the components listed and/or may have other elements instead of, or in addition to, those listed above.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Each user device 102 is further configured to allow a user to send a request for authenticating the user device 102 to access a virtual lounge 140 in the virtual environment 130 and to interact with the server 104. As another example, a user may use a user device 102 to send an interaction request 144 that requests a transfer of real-world resources and/or virtual resources between the user device 102 and the server 104. Example processes are described in more detail below in FIGS. 3-4.

Each user device 102 is configured to display a two-dimensional (2D) or three-dimensional (3D) representation of a virtual environment 130 to a user. Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. Within the virtual environment 130, each user may be associated with a user device 102 and an avatar 132. An avatar 132 is a graphical representation of the user device 102 and the user within the virtual environment 130. Examples of the avatars 132 include, but are not limited to, a person, an animal, or an object. In some embodiments, the features and characteristics of the avatar 132 may be customizable and user defined. For example, the size, shape, color, attire, accessories, or any other suitable type of appearance features may be specified by a user. By using the avatar 132, a user or the user device 102 can move within the virtual environment 130 to interact with one or more entities associated with the server 104 or other avatars 132 and objects within the virtual environment 130.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the server 104 (referring to FIG. 1).

The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3-4. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices.

The memory 204 is operable to store any of the information described with respect to FIGS. 1 and 3-4 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution. For example, the memory 204 may store the instructions 220, which are described below for performing the functions of user device 102 with respect to FIGS. 3-4.

Display 206 is configured to present visual information to a user (for example, user in FIG. 1) in an augmented reality environment that overlays virtual or graphical objects onto tangible objects in a real scene in real-time. In other embodiments, the display 206 is configured to present visual information to the user as the virtual environment 130 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user device 102. Camera 208 may be configured to capture images continuously, at predetermined intervals, or on-demand. For example, camera 208 may be configured to receive a command from the user to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. Wireless communication interface 210 is configured to employ any suitable communication protocol.

The network interface 212 is configured to enable wired and/or wireless communications. The network interface 212 is configured to communicate data between the user device 102 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user. Microphone 214 is communicably coupled to processor 202.

GPS sensor 216 is configured to capture and to provide geographical location information. For example, GPS sensor 216 is configured to provide a geographic location of a user, such as user, employing user device 102. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. Biometric device 218 is communicably coupled to processor 202.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. The server 104 is generally configured to oversee the operations of the virtual lounge interaction engine 110, as described further below in conjunction with the operational flows of the method 300 and the operational data flow 400 described in FIGS. 3 and 4. In particular embodiments, the server 104 may be implemented in the cloud or may be organized in either a centralized or distributed manner.

Processor

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute information security software instructions 116 to implement the virtual lounge interaction engine 110 to generate a virtual environment 130. In this way, processor 108 may be a special-purpose computer designed to implement the functions disclosed herein.

In an embodiment, the virtual lounge interaction engine 110 is implemented using logic units, FPGAs, ASICs, DSPs, or any other suitable hardware. The virtual lounge interaction engine 110 is configured to operate as described in FIGS. 3 and 4. The virtual lounge interaction engine 110 may be configured to perform the operations of the method 300 as described in FIG. 3. For example, the virtual lounge interaction engine 110 may be configured to provide multi-factor authentication within a real-world environment and a virtual environment 130 for a user to access and interact with one or more entities in the virtual environment 130. As another example, the virtual lounge interaction engine 110 may be configured to facilitate real-world resource and/or virtual resource transfers between users within a virtual environment 130.

The memory 114 is a hardware device that is operable to store any of the information described above with respect to FIGS. 1-4 along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116, communication data 164 including requests 144 and user profiles 402, interaction token 138, interaction dataset 148, user interaction session dataset 150, login credentials 146, virtual environment information 118, real-world information 120, avatars 132, virtual lounge 140, virtual sub-lounges 142, virtual environment 130, and/or any other data or instructions. The information security software instructions 116 may comprise any suitable set of instructions, logic, rules, or code operable to execute the virtual lounge interaction engine 110. In an example operation, the memory may store a user interface application 152, a virtual lounge interaction model 154, and other program models which executed by the processor 108 to implement operational flows of the system of FIG. 1.

The virtual environment information 118 comprises user information 122 and environment information 124. The user information 122 generally comprises information that is associated with any user profiles associated with user accounts that can be used within a virtual environment 130. For example, user information 122 may comprise user profile information, online account information, digital assets information, or any other suitable type of information that is associated with a user within a virtual environment 130. A user profile comprises a set of user login credentials 146 associated with a user account for a user device to access the virtual lounge 140 and the plurality of virtual sub-lounges 142 in a virtual environment 130. The user profile may comprise one or more of user identifiers, username, physical address, email address, phone number, and any other data associated with the user account, such as documents, files, media items, etc. The plurality of user profiles may be stored by the processor 108 in the memory 114.

The environment information 124 generally comprises information about the appearance of a virtual environment 130. For example, the environment information 124 may comprise information associated with objects, landmarks, buildings, structures, avatars 132, virtual lounge 140, virtual sub-lounges 142, or any other suitable type of element that is present within a virtual environment 130. In some embodiments, the environment information 124 may be used to create a representation of a virtual environment 130 for users. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. For example, some virtual environment 130 may be configured to use gravity whereas other virtual environment 130 may not be configured to use gravity.

The real-world information 120 comprises user information 126 and environment information 128. The user information 126 generally comprises information that is associated with user profiles and user accounts that can be used within the real world. For example, user information 126 may comprise user profile information, account information, or any other suitable type of information that is associated with a user within a real-world environment. The user profile comprises the same set of user login credentials 146 associated with a user account for a user device to access and interact with systems or platforms associated with one or more entities or sub-entities in a physical environment. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with one or more entities. Since the server 104 has access to both the virtual environment information 118 and the real-world information 120, the server 104 may link the virtual environment information 118 and the real-world information 120 together for a user such that changes to the virtual environment information 118 affect or propagate to the real-world information 120 and vice-versa. For example, the same set of user login credentials 146 associated with a user account for a user device to access the virtual lounge 140 are also used for the user device to access and interact with the systems or platforms associated with one or more entities or sub-entities in a physical environment. The server 104 may be configured to store one or more maps that translate or convert different types of interactions between the real world and the virtual environment 130 and vice-versa.

The network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Virtual Lounge Interaction Engine

Virtual lounge interaction engine 110 may include, but is not limited to, one or more separate and independent software and/or hardware components of a server 104. In some embodiment, the virtual lounge interaction engine 110 may be implemented by the processor 108 by executing the information security software instructions 116 to create a virtual environment 130, generate a virtual lounge 140 including a plurality of virtual sub-lounges 142 in the virtual environment 130. In some embodiments, the virtual lounge interaction engine 110 may be implemented by the processor 108 by executing the user interface application 152 and the virtual lounge interaction model 154 to process communication data 164 including a user request from a user device 102, generate an avatar 132 associated with the user device 102, authorize the avatar 132 to navigate through and interact with the plurality of virtual sub-lounges 142 associated with one or more entities through the server 104. The operation of the disclosed system 100 is described below.

Generating a Virtual Lounge Including a Plurality of Virtual Sub-Lounges

The server 104 may generate a virtual environment 130 based on the virtual environment information 118 and the real-world information 120. The virtual environment 130 may be a graphical or virtual representation of a metaverse, a map, a city, a building interior, a landscape, a fictional location, an alternate reality, or any other suitable type of location or environment. FIG. 1 illustrates an example of a virtual lounge 140 within a virtual environment 130. In some embodiments, the virtual environment 130 comprises a virtual lounge 140 which includes a plurality of associated virtual sub-lounges 142 (e.g., 142a-142d). The virtual lounge 140 is associated with one or more entities and corresponding entity features in a real-world environment. In one embodiment, each virtual sub-lounge 142 may be configured and executed by the processor 108 to provide one or more services provided by the same or different sub-entities at different physical locations in the real-world environment. The server 104 may be configured to store one or more maps executed by the processor 108 that translate or convert different types of interactions occurred in the virtual lounge 140 between the real world and the virtual environment 130 and vice-versa.

Generating an Avatar for Entering a Virtual Lounge in a Virtual Environment

Within the virtual environment 130, an avatar 132 is generated by the processor 108 as a graphical representation of a user device 102 within the virtual environment 130. The avatar 132 is associated with the corresponding user profile which may include one or more user identifiers, username, physical address, email address, phone number, documents associated with a user account and an entity. The avatar 132 includes a plurality of features and characteristics which are processed by the processor 108 to present the avatar 132 as the graphical representation of a user device 102 in the virtual environment 130.

For example, the server 104 may receive a signal indicating a physical location of the user device 102 and/or detect the user device 102 in the real-world environment. The server 104 may store the received signal in the memory 114. The server 104 may determine a virtual location of the avatar 132 associated with the user device 102 in the virtual environment 130 based on the physical location of the user device 102. The server 104 may obtain the environment information 124 and environment information 128 associated with the virtual location and physical location of the user device 102. The server 104 may generate and present an avatar 132 in the virtual environment 130 based on the user profile, the obtained environment information 124 and environment information 128. By using the user device 102, the avatar 132 can move or maneuver and interact with different entities, other avatars, and objects within the virtual environment 130. For example, the objects may be associated with fillable forms or documents, questions required for completing a task through the virtual lounge 140, etc.

Authentication and Interaction Processes for an Avatar Navigating in a Virtual Environment This process may be employed to authenticate an avatar 132 associated with a user device 102 to enter and perform interactions with one or more entities or sub-entities in the plurality of the virtual sub-lounges 142 while navigating within the virtual environment 130.

In an example operation, the server 104 may receive incoming communication data 164 from an avatar 132 through a user device 102 for accessing the virtual lounge 140 via the network 106. The communication data 164 may include an interaction request 144 for completing a task by accessing the user profile, establishing an interaction session to interact with one or more entities or sub-entities through the virtual lounge 140. The one or more entities or sub-entities provide one or more services via the server 104 in the network 106. For example, the user may initiate the interaction request 144 by accessing a user interface application 152 through a user device 102 with one of the login credentials 146 for interacting with the server 104. The server 104 may verify the login credential 146 and further access the memory 114 to obtain a set of login credentials 146 associated with one or more entities or sub-entities of the plurality of the virtual sub-lounges 142 in the virtual environment 130. Based on the set of user login credentials 146, the server 104 may authorize the avatar 132 associated with the user device 102 to move or maneuver through the virtual lounge 140 and access one or more virtual sub-lounges 142 to complete the task in the virtual environment 130. The task may be predefined in a task flow determined by the server 104 based on the received communication data 164. The task and the task flow may be determined by the server 104 for the avatar 132 to perform the plurality of interactions with the corresponding virtual sub-lounges 142 through the virtual lounge 140.

Example Operational Flow for Navigating Through a Dynamic Virtual Lounge for Interactions in a Virtual Environment FIG. 3 is an example operational flow of a method 300 of navigating through a dynamic virtual lounge and performing interactions without reauthentication in the virtual environment. Modifications, additions, or omissions may be made to method 300. Method 300 may include more, fewer, or other operations. For example, operations may be performed by the server 104 in parallel or in any suitable order. While at times discussed as the computer system 100, processor 108, virtual lounge interaction engine 110, user interface application 152, virtual lounge interaction model 154 or components of any of thereof performing operations, any suitable system or components of the system may perform one or more operations of the method 300. For example, one or more operations of method 300 may be implemented, at least in part, in the form of the information security software instructions 116 of FIG. 1, stored on non-transitory, tangible, machine-readable media (e.g., memory 114 of FIG. 1) that when run by one or more processors (e.g., processor 108 of FIG. 1) may cause the one or more processors to perform operations 302-320. FIG. 4 is an example operational data flow 400 associated with the method 300 in an embodiment.

The method 300 begins at operation 302 where the server 104 accesses a virtual environment 130 that comprises a virtual lounge 140 including a plurality of associated virtual sub-lounges 142. The virtual lounge 140 is associated with at least one entity which provide one or more services in a real-world environment via the network 106. The plurality of the virtual sub-lounges 142 are each associated with the corresponding same or different entities or sub-entities which provide corresponding services in the real-world environment.

At operation 304, the server 104 receives incoming communication data 164 including an interaction request 144 from an avatar 132 through a user device 102 for establishing an interaction session in the virtual environment 130 between an avatar 132 and the virtual lounge 140 through the server 104 via the network 106.

At operation 306, the server 104 authorizes, based on a user profile 402a stored in the memory 114, the interaction session in the virtual environment 130 between the avatar 132 and the virtual lounge 140. The memory 114 stores the user profile that comprises a set of user login credentials 146 associated with a user account for a user device 102. The set of user login credentials 146 are used for the avatar 132 through the user device 102 to access user interface application 152 and a plurality of virtual sub-lounges 142 in the virtual lounge 140.

In some embodiment, the server 104 identifies the set of the virtual sub-lounges 142 based on the communication data 164 received from the user device 102. The communication data 164 is indicative of a task to be completed during the interaction session. In one embodiment, the server 104 may instruct the avatar 132 to access the set of the virtual sub-lounges 142 in a particular order that provide respective interactions of the interaction session in the corresponding virtual sub-lounges 142. For example, one interaction to be performed may depend on whether another interaction is complete based on the task flow. In one embodiment, the server 104 may allow the avatar 132 to access the set of the virtual sub-lounges 142 to perform the respective interactions sequentially. In this case, one interaction may not depend on whether another interaction is complete.

At operation 308, the server 104 detects the avatar 132 entering a first virtual sub-lounge 142a of the virtual lounge 140. The server 104 may receive a signal indicating a physical location of the user device 102 and detect the user device 102 moving in the real-world environment. The server 104 stores the received signal in the memory 114 and determines a virtual location of the avatar 132 moving with the user device 102 in the virtual environment 130 based on the physical location of the user device 102. In one embodiment, the server 104 may receive a signal from the user device 102 and detect the avatar 132 moving and entering the first virtual sub-lounge 142a of the virtual lounge 140 in the virtual environment 130.

At operation 310, the server 104 authorizes the avatar 132 to enter and interact with the first virtual sub-lounge 142a of the virtual lounge 140. The server 104 verifies the user profile 402a stored in the memory 114 and authorizes the user entering a first virtual sub-lounge 142a associated with a first entity based at least in part upon the user login credentials 146 associated with the virtual lounge 140 as described above. The avatar 132 directly moves and enters the first virtual sub-lounge 142a of the virtual lounge 140 without their login credentials 146 entered in user interface application 152.

At operation 312, the server 104 conducts a first interaction between the avatar 132 and the first virtual sub-lounge 142a. For example, the server 104 may obtain the user profile 402a stored in the memory and receive a first user input 404a using the avatar 132 of the user device 102 through the user interface application 152. The server 104 generates a first interaction dataset 148a and a first interaction token 138a based on user profile 402a, the first user input 404a, and the task defined in the first interaction. The server 104 may update the user profile 402a with the first interaction dataset 148a and/or the first interaction token 138a and generate an updated user profile 402b. The first interaction dataset 148a comprises the user profile 402b and data representing the first interaction between the avatar 132 and the first entity or sub-entity. The server 104 may determine and indicate that the first interaction in the first virtual sub-lounge 142a is complete by sending the first interaction token 138a to the user device 102. In some embodiment, the server 104 may present the first interaction token 138a, the updated user profile 402b, and the first interaction dataset 148a on a graphical user interface of the user device.

The server 104 may instruct the user to proceed to enter the second virtual sub-lounge 142b based on the set of the identified virtual sub-lounges. The avatar 132 may move using the user device to enter the next virtual sub-lounge.

At operation 314, the server 104 detects the avatar 132 entering a second virtual sub-lounge 142b of the virtual lounge 140. The server 104 may receive a signal indicating a second physical location of the user device 102 and detect the user device 102 moving in the real-world environment. The server 104 determines a virtual location of the avatar 132 moving with the user device 102 in the virtual environment 130 based on the physical location of the user device 102. In one embodiment, the server 104 may receive a signal from the user device 102 and detect the avatar 132 moving and entering the second virtual sub-lounge 142b of the virtual lounge 140.

At operation 316, the server 104 authorizes the avatar 132 to enter and interact with the second virtual sub-lounge 142b of the virtual lounge 140 based at least in part upon the user login credentials 146 associated with the virtual lounge 140. The server 104 verifies the user profile 402b and authorizes the user entering a second virtual sub-lounge 142b associated with a second entity. The avatar 132 directly moves and enters the second virtual sub-lounge 142b of the virtual lounge 140 without their login credentials 146 entered in user interface application 152.

At operation 318, the server 104 conducts a second interaction between the avatar 132 and the second virtual sub-lounge 142b. For example, the server 104 may obtain the user profile 402b stored in the memory and receive a second user input 404b via the user device 102 through the user interface application 152. The server 104 generates a second interaction dataset 148b and a second interaction token 138b for the avatar 132 based on user profile 402b, user input 404b, and the task defined in the second interaction. The server 104 may update the user profile 402b with second interaction dataset 148b and/or the second interaction token 138b and generate an updated user profile 402c. The second interaction dataset 148b comprises the user profile 402c and data representing the second interaction between the avatar 132 and the second entity. The server 104 may determine and indicate that the second interaction is complete by sending the second interaction token 138b to the user device 102. In some embodiment, the server 104 may present the second interaction token 138b, the updated user profile 402c, and the second interaction dataset 148b on a graphical user interface of the user device.

The second entity or sub-entity may be the same or different from the first entity or sub-entity. The second entity in the second virtual sub-lounge 142b may provide a service different from the service provided by the first entity in the first virtual sub-lounge 142a.

In some embodiment, the avatar 132 continuously moves or maneuvers and enters the third virtual sub-lounge 142c based on the set of identified virtual sub-lounges until the task is complete by the server 104. For example, the server

104 may obtain the user profile 402c stored in the memory and receive a third user input 404c via the user device through the user interface application 152. The server 104 verifies the user profile 402c and authorizes the user directly entering a third virtual sub-lounge 142c associated with a third entity or sub-entity.

The server 104 conducts a third interaction between the avatar 132 and the third entity or sub-entity. The server 104 generates a third interaction dataset 148c and a third interaction token 138c for the avatar 132 based on user profile 402c, user input 404c and the task defined in the third interaction.

The server 104 may update the user profile 402c with the third interaction dataset 148c and/or the third interaction token 138c and generate an updated user profile 402d. The second interaction dataset 148b comprises the user profile 402d and data representing the second interaction between the avatar 132 and the third entity. The server 104 may determine and indicate that the third interaction is complete by sending the third interaction token 138c to the user device 102. In some embodiment, the server 104 may present the third interaction token, the updated user profile, and the third interaction dataset on a graphical user interface of the user device. The third entity may be the same or different from the first entity and the second entity. The third entity associated with the third virtual sub-lounge 142c may provide a service different from the services provided by the first entity and the second entity.

At operation 320, the server 104 generates a user interaction session dataset 150 for the avatar 132. The user interaction session dataset 150 may be generated based on the obtained interaction tokens 138a-138c and interaction datasets 148a-148c. In one embodiment, the user interaction session dataset 150 may comprise the obtained interaction tokens 138a-138c and interaction datasets 148a-148c. In some embodiment, the server 104 may perform any other suitable type of operation on the obtained interaction tokens 138a-138c and interaction datasets 148a-148c to generate a user interaction session dataset 150 for the avatar 132. For example, the server 104 may perform a hashing operation on two or more of the obtained interaction tokens 138a-138c and interaction datasets 148a-148c. The result of the hashing operations may serve as the user interaction session dataset 150 for the avatar 132. The server 104 stores the user interaction session dataset 150 in the memory 114 and associate it with the user profile.

In some embodiment, the server 104 may generate a graphical representation of interaction tokens 138a-138c and interaction datasets 148a-148c within the virtual environment 130. The server 104 may display them on a display of the user device 102. The graphical representation of the interaction tokens and interaction datasets may allow the user visually to access to the user profile and perform corresponding actions on the user profile through the user device in the network.

In some embodiments, software instructions 116 associated with the operational flows and other described processes may be deployed into a practical application executed by the server to implement any operations in the virtual lounge 140. The practical application may be implemented by the processor 108 to receive and process communication data 164 from user device 102, generate an avatar 132 associated with the user device 102, and detect the avatar 132 entering a virtual lounge in a virtual environment 130. The practical application may be implemented by the processor 108 to authorize the avatar 132 to seamlessly navigate without reauthentication and perform interactions in the corresponding virtual sub-lounges 142 in the virtual environment 130. The avatar 132 may seamlessly navigate through the virtual sub-lounges 142 and complete a task predefined by the server 104 based on the communication data 164 via the network in real time.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory operable to store:
    a user profile comprising a set of user login credentials associated with a user account for a user device to access one or more locations in a virtual environment; and
a processor operably coupled to the memory, the processor configured to:
    access a virtual environment comprising a virtual lounge and a plurality of associated virtual sub-lounges, wherein the virtual lounge is associated with at least one entity in a real-world environment, and the plurality of associated virtual sub-lounges are associated with corresponding entities in the real-world environment;
    receive an interaction request from the user device for an interaction session in the virtual environment between an avatar associated with the user device and the virtual lounge, wherein the interaction request includes a request to transfer real-world resources between the user account and the at least one entity in the real-world environment;
    authorize, based on the user profile, the interaction session in the virtual environment between the avatar and the virtual lounge;
    detect the avatar entering a first virtual sub-lounge of the virtual lounge;
    authorize the avatar to enter and interact with the first virtual sub-lounge of the virtual lounge based at least in part upon the user login credentials associated with the virtual lounge;

conduct a first interaction between the avatar and the first virtual sub-lounge and generate a first interaction dataset and a first interaction token for the avatar, wherein the first interaction dataset comprises data representing the first interaction between the avatar and a first entity, and the first interaction token indicates that the first interaction is complete;

in response to conducting the first interaction between the avatar and the first virtual sub-lounge, update the user profile with the first interaction dataset, wherein updating the user profile includes transferring the real-world resources from the user account to the first entity;

detect the avatar entering a second virtual sub-lounge of the virtual lounge;

authorize the avatar to enter and interact with the second virtual sub-lounge of the virtual lounge based at least in part upon the user login credentials associated with the virtual lounge;

conduct a second interaction between the avatar and the second virtual sub-lounge and generate a second interaction dataset and a second interaction token for the avatar, wherein the second interaction dataset comprises data representing the second interaction between the avatar and a second entity, and the second interaction token indicates that the second interaction is complete;

in response to conducting the second interaction between the avatar and the second virtual sub-lounge, update the user profile with the second interaction dataset, wherein:

updating the user profile comprises transferring the real-world resources from the user account to the second entity;

the first entity provides a different service relative to a service provided by the second entity in the real-world environment; and the first entity is at a different physical location in the real-world environment relative to a physical location of the second entity in the real-world environment; and generate a user interaction session dataset for the avatar based on the first interaction dataset, the first interaction token, the second interaction dataset and the second interaction token.

2. The system of claim 1, wherein the processor is further configured to, in response to receiving the interaction request:

identify a set of virtual sub-lounges in a particular order based on communication data received from the user device, each virtual sub-lounge being configured to provide respective interactions in the interaction session between the avatar and the virtual lounge; and determine the first virtual sub-lounge of the virtual lounge for the avatar to enter.

3. The system of claim 1, wherein the processor is further configured to:

send the first interaction token to the user device to indicate that the first interaction is complete;

update the user profile based on the first interaction dataset and the first interaction token; and present, on a graphical user interface of the user device, the first interaction token, the updated user profile, and the first interaction dataset.

4. The system of claim 1, wherein the processor is further configured to review the user interaction session dataset to determine whether each of the interaction sessions are complete.

5. The system of claim 4, wherein the processor is further configured to:

in response to determining that each of the interaction sessions are complete, present the user interaction session dataset on a graphical user interface of the user device.

6. The system of claim 1, wherein the processor is further configured to:

receive a signal indicating a physical location of the user device in the real-world environment;

store the received signal in the memory; and determine a virtual location of the avatar associated with the user device in the virtual environment based on the physical location of the user device.

7. A method comprising:

accessing a virtual environment comprising a virtual lounge and a plurality of associated virtual sub-lounges, wherein the virtual lounge is associated with at least one entity in a real-world environment, and the plurality of associated virtual sub-lounges are associated with corresponding entities in the real-world environment;

receiving an interaction request from the user device for an interaction session in the virtual environment between an avatar associated with the user device and the virtual lounge, wherein the interaction request includes a request to transfer real-world resources between the user account and the at least one entity in the real-world environment;

authorizing, based on a user profile, the interaction session in the virtual environment between the avatar and the virtual lounge;

detecting the avatar entering a first virtual sub-lounge of the virtual lounge;

authorizing the avatar to enter and interact with the first virtual sub-lounge of the virtual lounge based at least in part upon a set of user login credentials associated with the virtual lounge and stored in a memory;

conducting a first interaction between the avatar and the first virtual sub-lounge and generating a first interaction dataset and a first interaction token for the avatar, wherein the first interaction dataset comprises data representing the first interaction between the avatar and a first entity, and the first interaction token indicates that the first interaction is complete;

in response to conducting the first interaction between the avatar and the first virtual sub-lounge, updating the user profile with the first interaction dataset, wherein updating the user profile includes transferring the real-world resources from the user account to the first entity;

detecting the avatar entering a second virtual sub-lounge of the virtual lounge;

authorizing the avatar to enter and interact with the second virtual sub-lounge of the virtual lounge based at least in part upon the user login credentials associated with the virtual lounge;

conducting a second interaction between the avatar and the second virtual sub-lounge and generating a second interaction dataset and a second interaction token for the avatar, wherein the second interaction dataset comprises data representing the second interaction between the avatar and a second entity, and the second interaction token indicates that the second interaction is complete;

in response to conducting the second interaction between the avatar and the second virtual sub-lounge, updating the user profile with the second interaction dataset, wherein:

updating the user profile includes transferring the real-world resources from the user account to the second entity;

the first entity provides a different service relative to a service provided by the second entity in the real-world environment; and the first entity is at a different physical location in the real-world environment relative to a physical location of the second entity in the real-world environment; and generating a user interaction session dataset for the avatar based on the first interaction dataset, the first interaction token, the second interaction dataset and the second interaction token.

8. The method of claim 7, further comprising, in response to receiving the interaction request, identifying a set of virtual sub-lounges in a particular order based on communication data received from the user device, each virtual sub-lounge being configured to provide respective interactions in the interaction session between the avatar and the virtual lounge; and determining the first virtual sub-lounge of the virtual lounge for the avatar to enter.

9. The method of claim 7, further comprising:

sending the first interaction token to the user device to indicate that the first interaction is complete;

updating the user profile based on the first interaction dataset; and presenting, on a graphical user interface of the user device, the first interaction token, the updated user profile, and the first interaction dataset.

10. The method of claim 7, further comprising reviewing the user interaction session dataset to determine whether each of the interaction sessions are complete.

11. The method of claim 10, further comprising, in response to determining that each of the interaction sessions are complete, presenting the user interaction session dataset on a graphical user interface of the user device.

12. The method of claim 7, further comprising:

receiving a signal indicating a physical location of the user device in the real-world environment;

storing the received signal in the memory; and determining a virtual location of the avatar associated with the user device in the virtual environment based on the physical location of the user device.

13. A non-transitory computer-readable medium storing instructions that, when executed by a processor, causes the processor to:

access a virtual environment comprising a virtual lounge and a plurality of associated virtual sub-lounges, wherein the virtual lounge is associated with at least one entity in a real-world environment, and the plurality of associated virtual sub-lounges are associated with corresponding entities in the real-world environment;

receive an interaction request from the user device for an interaction session in the virtual environment between an avatar associated with the user device and the virtual lounge, wherein the interaction request includes a request to transfer real-world resources between the user account and the at least one entity in the real-world environment;

authorize, based on a user profile, the interaction session in the virtual environment between the avatar and the virtual lounge;

identify a set of virtual sub-lounges in a particular order based on communication data received from the user device, each virtual sub-lounge being configured to provide respective interactions in the interaction session between the avatar and the virtual lounge;

determine the first virtual sub-lounge of the virtual lounge for the avatar to enter;

detect the avatar entering the first virtual sub-lounge of the virtual lounge;

authorize the avatar to enter and interact with the first virtual sub-lounge of the virtual lounge based at least in part upon a set of user login credentials associated with the virtual lounge and stored in the memory;

conduct a first interaction between the avatar and the first virtual sub-lounge and generate a first interaction dataset and a first interaction token for the avatar, wherein the first interaction dataset comprises data representing the first interaction between the avatar and a first entity, and the first interaction token indicates that the first interaction is complete;

in response to conducting the first interaction between the avatar and the first virtual sub-lounge, update the user profile with the first interaction dataset, wherein updating the user profile includes transferring the real-world resources from the user account to the first entity;

detect the avatar entering a second virtual sub-lounge of the virtual lounge;

authorize the avatar to enter and interact with the second virtual sub-lounge of the virtual lounge based at least in part upon the user login credentials associated with the virtual lounge;

conduct a second interaction between the avatar and the second virtual sub-lounge and generate a second interaction dataset and a second interaction token for the avatar, wherein the second interaction dataset comprises data representing the second interaction between the avatar and a second entity, and the second interaction token indicates that the second interaction is complete;

in response to conducting the second interaction between the avatar and the second virtual sub-lounge, update the user profile with the second interaction dataset, wherein:

updating the user profile includes transferring the real-world resources from the user account to the second entity;

the first entity provides a different service relative to a service provided by the second entity in the real-world environment; and the first entity is at a different physical location in the real-world environment relative to a physical location of the second entity in the real-world environment; and generate a user interaction session dataset for the avatar based on the first interaction dataset, the first interaction token, the second interaction dataset and the second interaction token.

14. The non-transitory computer-readable medium of claim 13, wherein the instructions when executed by the processor further cause the processor to:

send the first interaction token to the user device to indicate that the first interaction is complete;
update the user profile based on the first interaction dataset; and
present, on a graphical user interface of the user device, the first interaction token, the updated user profile, and the first interaction dataset.

15. The non-transitory computer-readable medium of claim 13, wherein the instructions when executed by the processor further cause the processor to review the user interaction session dataset to determine whether each of the interaction sessions are complete.

16. The non-transitory computer-readable medium of claim 15, wherein the instructions when executed by the processor further cause the processor to:
in response to determining that each of the interaction sessions are complete, present the user interaction session dataset on a graphical user interface of the user device.

17. The non-transitory computer-readable medium of claim 13, wherein the instructions when executed by the processor further cause the processor to:
receive a signal indicating a physical location of the user device in the real-world environment;
store the received signal in the memory; and
determine a virtual location of the avatar associated with the user device in the virtual environment based on the physical location of the user device.

* * * * *